US012176605B2

(12) United States Patent
Chouard

(10) Patent No.: US 12,176,605 B2
(45) Date of Patent: Dec. 24, 2024

(54) TRANSMISSION DEVICE FOR A MOTOR VEHICLE FOR TRANSMITTING A RADIO SIGNAL, WIRELESS KEY SYSTEM, AND MOTOR VEHICLE

(71) Applicant: Bayerische Motoren Werke Aktiengesellschaft, Munich (DE)

(72) Inventor: Florian Chouard, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 364 days.

(21) Appl. No.: 17/790,783

(22) PCT Filed: Feb. 3, 2021

(86) PCT No.: PCT/EP2021/052566
§ 371 (c)(1),
(2) Date: Jul. 5, 2022

(87) PCT Pub. No.: WO2021/160496
PCT Pub. Date: Aug. 19, 2021

(65) Prior Publication Data

US 2022/0399638 A1 Dec. 15, 2022

(30) Foreign Application Priority Data

Feb. 10, 2020 (DE) .................... 10 2020 103 283.8

(51) Int. Cl.
*H01Q 1/32* (2006.01)
*H01Q 1/36* (2006.01)
*H01Q 7/08* (2006.01)

(52) U.S. Cl.
CPC ............ *H01Q 1/3241* (2013.01); *H01Q 1/36* (2013.01); *H01Q 1/362* (2013.01); *H01Q 7/08* (2013.01)

(58) Field of Classification Search
CPC ........... H01Q 1/36; H01Q 1/362; H01Q 1/38; H01Q 1/3233; H01Q 1/3241; H01Q 7/00;
(Continued)

(56) References Cited

U.S. PATENT DOCUMENTS 4,495,503 A 1/1985 Morman
2003/0076069 A1 4/2003 Lourens et al.
(Continued)

FOREIGN PATENT DOCUMENTS

CN 106935954 A 7/2017
DE 10 2005 032 379 A1 1/2007
(Continued)

OTHER PUBLICATIONS

International Search Report (PCT/ISA/210) issued in PCT Application No. PCT/EP2021/052566 dated Apr. 16, 2021 with English translation (four (4) pages).
(Continued)

*Primary Examiner* — Robert Karacsony
(74) *Attorney, Agent, or Firm* — Crowell & Moring LLP

(57) ABSTRACT

A transmission device for a motor vehicle for transmitting a radio signal is provided. A coil antenna is provided for emitting the radio signal, and an electric driver circuit is designed to generate an electric alternating current with a specified transmission frequency in the coil antenna. The coil antenna is arranged on at least one support element, and a parasitic parallel capacitance acting parallel to an intrinsic inductance of the coil antenna is produced by virtue of the geometry and/or the material of the at least one support element and/or by virtue of the shape of the coil antenna, the parasitic parallel capacitance together with the intrinsic inductance functioning as a parallel resonant circuit with a specified intrinsic resonant frequency with respect to the driver circuit.

8 Claims, 4 Drawing Sheets

(58) Field of Classification Search
CPC ............ H01Q 7/005; H01Q 7/06; H01Q 7/08; H01Q 11/08
See application file for complete search history.

(56) References Cited

U.S. PATENT DOCUMENTS

| | | | | |
|---|---|---|---|---|
| 2009/0261946 | A1* | 10/2009 | Tenconi | H01Q 1/3241 340/5.72 |
| 2014/0203976 | A1 | 7/2014 | Yosui | |
| 2015/0097741 | A1 | 4/2015 | Pachler et al. | |
| 2018/0204400 | A1* | 7/2018 | Froitzheim | H04B 5/45 |

FOREIGN PATENT DOCUMENTS

| | | | |
|---|---|---|---|
| DE | 10 2013 111 027 | A1 | 4/2015 |
| EP | 3 189 650 | B1 | 11/2020 |
| WO | WO 2018/072827 | A1 | 4/2018 |

OTHER PUBLICATIONS

German-language Written Opinion (PCT/ISA/237) issued in PCT Application No. PCT/EP2021/052566 dated Apr. 16, 2021 (eight (8) pages).
German-language Search Report issued in German Application No. 10 2020 103 283.8 dated Oct. 16, 2020 with partial English translation (11 pages).

* cited by examiner

TRANSMISSION DEVICE FOR A MOTOR VEHICLE FOR TRANSMITTING A RADIO SIGNAL, WIRELESS KEY SYSTEM, AND MOTOR VEHICLE

BACKGROUND AND SUMMARY OF THE INVENTION

The invention relates to a transmission device for a motor vehicle, so as to be able to emit a radio signal. The transmission device can, for example, be a part of a radio key system. It comprises a coil antenna and the driver circuit for driving the current in the coil antenna. The invention also comprises said radio key system and a motor vehicle having a radio key system of this kind. Systems of this kind are known per se and are also used as the industrial standard.

If a radio signal at a predefined transmission frequency is emitted by way of an antenna, it is generally difficult, in the case of a conventional antenna, to avoid what are known as harmonic waves, that is to say transmission signals at an integer multiple of the transmission frequency. Harmonic waves of this kind can then interfere with reception in other frequency bands.

WO 2018/072827 A1 discloses that it is possible to insert additional electrical conductor tracks and electrically insulating regions into a PCB-based antenna structure, which together act as what is known as a band-stop filter, by way of which the harmonic waves are able to be selectively damped. This, however, increases the space requirement for providing an antenna structure on a circuit board.

EP 3 189 560 B1 furthermore discloses that additional electrical conductor tracks can be added to an antenna structure on a circuit board so as to thereby prevent coupling between different parts of the antenna structure. In this case too there is an increased space requirement for implementing this antenna structure.

CN 106935954 A1 discloses that it is even possible to use additional electrical lines within an antenna structure to promote additional resonant properties, with the result that an antenna can have a plurality of different resonant frequencies and can therefore be used for a plurality of frequency bands.

The aforementioned solutions known from the prior art relate to antenna structures that have to be implemented on a circuit board.

In the context of a motor vehicle, however, what is known as a coil antenna (typically a coil with a ferrite core) can be favored, that is to say an antenna having an electrical conductor, for example a wire, that is wound in the form of a coil or helically. In this case, the surface of a circuit board is not available in order to be able to provide an additional electrical conductor structure for a band-stop filter for suppressing harmonics.

The invention is based on the object of damping resonant properties or oscillation properties at a multiple of the transmission frequency in a transmission apparatus having a coil antenna so that radio signals that cause interference at these harmonic waves are emitted only at less than a predefinable transmission power.

The object is achieved by the subjects of the claimed invention.

An embodiment of the invention provides an arrangement comprising a coil antenna and a driver circuit, which are referred to together here as a transmission device. This transmission device is configured to transmit a radio signal, in particular electromagnetic radio waves or a magnetic alternating field, from a motor vehicle. Said coil antenna, that is to say an antenna having an electrically conductive coil wire that is wound or formed in the shape of a coil or helically, or having an electrical conductor track that is in the form of a flat coil, is provided to emit the radio signal. The text below refers generally to the electrical conducting element of the coil antenna. The coil shape results in a coil. This coil of the coil antenna can be arranged on a ferrite core in a manner known per se. The electrical driver circuit is configured to generate an electric AC current with a predetermined transmission frequency in order to produce the radio signal in the coil antenna. In a manner known per se, this transmission frequency is the carrier frequency for a transmission signal that is intended to be emitted by the radio signal. The AC current therefore, in the known manner, has not only the transmission frequency itself, but also frequencies of a transmission frequency band that contains the transmission frequency.

However, as a result of non-linearities in the driver circuit, for example, the aforementioned harmonic waves or what are known as the harmonics may therefore additionally arise during operation of the coil antenna, that is to say that signal components that have a frequency that is an integer multiple of the transmission frequency can also be generated in the radio signal. In order to suppress or to damp at least some harmonics or one harmonic, the coil antenna is arranged on at least one support element. By way of example, the coil antenna can be arranged or placed on the aforementioned ferrite core and/or it can be surrounded from the outside by a tube or a housing, for example. The material of the support element, that is to say the support material, is preferably an electrical insulator, but with a known value of the dielectric constant, or a ferrite. On account of a geometry and/or a material type of the support material and/or on account of a geometry of a coil shape of the coil antenna on the support material (that is to say, for example, the pitch of the winding of the helix/coil and/or the diameter thereof), a parasitic parallel capacitance is obtained in parallel with the self-inductance of the coil antenna, the value of which parasitic parallel capacitance is dependent on said design parameters (material type and/or geometry). An embodiment of the invention now exploits the fact that, by virtue of the shape of the electrical conducting element of the coil antenna and by virtue of the proximity or presence of the support material of the support element, not only does the coil antenna have a self-inductance, a parasitic capacitance is also produced (on account of the dielectricity) that can act as the capacitance along the coil antenna. Said parasitic capacitance therefore acts as a parallel capacitance acting in parallel with the self-inductance. However, from the perspective of the driver circuit, that is to say with respect to the feed-in point for feeding the AC current into the coil antenna, the parallel capacitance together with the self-inductance collectively produce a parallel resonant circuit having a predetermined natural resonant frequency. A parallel resonant circuit of this kind now acts as a band-stop filter, however, that is to say, as viewed from the driver circuit, an AC current or an AC voltage at a predetermined frequency that corresponds to said natural resonant frequency is not able to be transferred to the coil antenna, or can be transferred to the coil antenna only if it has been damped. In this case, a value of the natural resonant frequency is set to an integer multiple of the transmission frequency by virtue of the geometry of the support element and/or the material type of the support material and/or the geometry of the coil shape on the support element. In other words, the geometric configuration and/or the choice of material for the support element and the coil antenna are used to adjust or set the parallel resonant circuit implicitly obtained in this way, comprising the self-inductance of the coil antenna itself and the parasitic parallel capacitance, in such a way that the resultant band-stop filter suppresses or damps a harmonic or a harmonic wave of the transmission frequency.

An embodiment of the invention thus results in the advantage that a band-stop filter for at least one harmonic or harmonic wave of the transmission frequency can also be provided, even additional space requirement, for a coil antenna, which therefore does not have to be arranged on a circuit board. In this regard, the inherent parallel resonant circuit is designed to have a natural resonant frequency so that its band-stop effect covers an integer multiple of the transmission frequency or this integer multiple is in the band-stop range of the parallel resonant circuit. The natural resonant frequency of the parallel resonant circuit therefore does not have to be set exactly to the integer multiple of the transmission frequency. As an alternative to this, provision can be made for the resultant band-stop range of this parallel resonant circuit to cover this integer multiple. It is thus possible to achieve the additional effect that the band-stop range covers two harmonics or two harmonic waves, for example, by virtue of the natural resonant frequency of the parallel resonant circuit being set between two harmonics, that is to say between two integer multiples of the transmission frequency.

Parameters that a person skilled in the art should use as a guide for configuring or designing a transmission device of this kind include the geometry of the support element (diameter of a bar on which the coil antenna is arranged and/or thickness of a casing that is arranged around the coil antenna, length, curvature) and/or the material type of the support material (for example rubber or rubber with integrated electrically conductive granules, for example carbon) and/or the geometry of the coil shape itself. In this case, simple technical experiments at a given transmission frequency can be used to ascertain suitable values. By way of example, based on an initial prototype with an initial geometry, two further prototypes are manufactured or simulated, the geometries of which differ from the initial geometry, one toward a larger value (e.g larger diameter) and one toward a smaller value (e.g smaller diameter). On the basis of a resultant change in the spectrum of the radio signal of said further prototypes in comparison to the spectrum of the initial prototype, it is possible to identify which change (larger value or smaller value) brings the spectrum of the transmission signal closer to the desired spectrum (with the damped harmonic waves at the multiple of the transmission frequency). The change can then be continued in this direction (larger value or smaller value) for a further prototype until the desired spectrum is achieved. This therefore iteratively results in suitable values for the aforementioned design parameters.

The invention also comprises further embodiments which afford additional advantages.

In one embodiment, the integer multiple corresponds to the fourth or fifth or sixth or seventh harmonic of the transmission frequency, or said transmission frequency is covered by the band-stop range in each case. This transmission range is already very far away from the original transmission frequency, with the result that it is very likely that receivers for other radio technologies in a motor vehicle are provided here, which means that, particularly at these frequencies, suppression of the harmonics by way of the band-stop range of the parallel resonant circuit is worthwhile.

In one embodiment, an amplifier element, as can be provided in the driver circuit to produce or bring about the AC current, is interconnected with the coil antenna by way of a circuit part that is free of resonance, that is to say does not have its own resonant frequency, or the resonant frequency of which, if said circuit part has one, is at least different from the natural resonant frequency of the parallel resonant circuit. That is to say that there is no additional filter provided in the transmission device between the driver circuit and the coil antenna, and therefore in particular no additional band-stop filter circuit. Rather, the connecting circuit part can, for example, exclusively comprise or provide electrical lines, i.e. for example wires or conductor tracks. Therefore, the suppression or damping of said harmonics is brought about solely by way of the parallel resonant circuit, as obtained by way of the self-inductance of the coil antenna and the parasitic parallel capacitance. This results in a particularly compact design for the transmission device. Said amplifier element can be an operational amplifier or a transistor circuit, for example.

According to one embodiment, the transmission frequency is set to a value in a value range from 70 kilohertz to 250 kilohertz in the driver circuit. It has been found that such a transmission frequency allows the damping of harmonics to be implemented reliably by virtue of the described design or configuration of the support material and/or the coil antenna.

In one embodiment, the aforementioned driver circuit is used to transmit what is known as a challenge signal for a radio key. A challenge signal of this kind needs to be transmitted from a motor vehicle to challenge a radio key for identification, which can be necessary to control the central locking or locking system of the motor vehicle. By way of example, a transmission device of this kind is not able to interfere with the radio reception of the motor vehicle by transmitting a radio signal containing the challenge signal. This can be achieved particularly advantageously using the configuration of the transmission device according to an embodiment of the invention.

In this context, the invention also provides a radio key system for a motor vehicle, wherein the radio key system has a control circuit for generating a transmission signal, for example the aforementioned challenge signal. The control circuit is coupled to an embodiment of the transmission device according to an embodiment of the invention and is configured to actuate the transmission device by way of the transmission signal. The transmission signal can then be up-converted to the transmission frequency by the aforementioned driver circuit, for example by way of what is known as mixing, and the electrical signal thus produced can be used to generate the AC current in the coil antenna. The coil antenna then emits a radio signal that, in the range of the integer multiple of the transmission frequency, then has less transmission power in the band-stop range than if the inherent parallel resonant circuit were to have a different natural resonant frequency. If a radio key then responds, a received signal of the radio key likewise has to be received by the radio key system. To this end, the aforementioned control circuit of the radio key system is additionally coupled to a receiver circuit for a response signal of a radio key. The response signal can be a response to the challenge signal. Additionally or alternatively, the receiver circuit can be configured to ascertain, on the basis of the response signal, a distance and/or a relative direction in which the radio key is located in relation to the motor vehicle. Location of this kind is known per se from the prior art.

If the radio key system is provided in a motor vehicle, the result is therefore a motor vehicle that is likewise a component part of an embodiment of the invention and is distinguished by the embodiment of the radio key system according to an embodiment of the invention. A motor vehicle of this kind can be in the form of a passenger car or a truck, for example.

In one embodiment, this motor vehicle has a radio receiver with a predetermined reception frequency range. Provision is then made, in this case, for said natural resonant frequency of the inherent parallel resonant circuit of the transmission device to be set to a value that is in said reception frequency range. When the radio signal is emitted from the transmission device, for example for a radio key system, this therefore prevents the radio receiver from receiving harmonics or harmonic waves of the radio signal at more than a predetermined maximum transmission power in its reception frequency range, and this leading to interference.

Further features of the invention will become apparent from the claims, the figures and the description of the figures. The features and combinations of features mentioned in the description above and the features and combinations of features mentioned in the description of the figures below and/or shown on their own in the figures may be used not only in the respectively specified combination but also in other combinations or on their own.

Exemplary embodiments of the invention are described below.

DETAILED DESCRIPTION OF THE DRAWINGS

In the figures, elements that have the same function have the same reference signs in each case.

Figure 1:
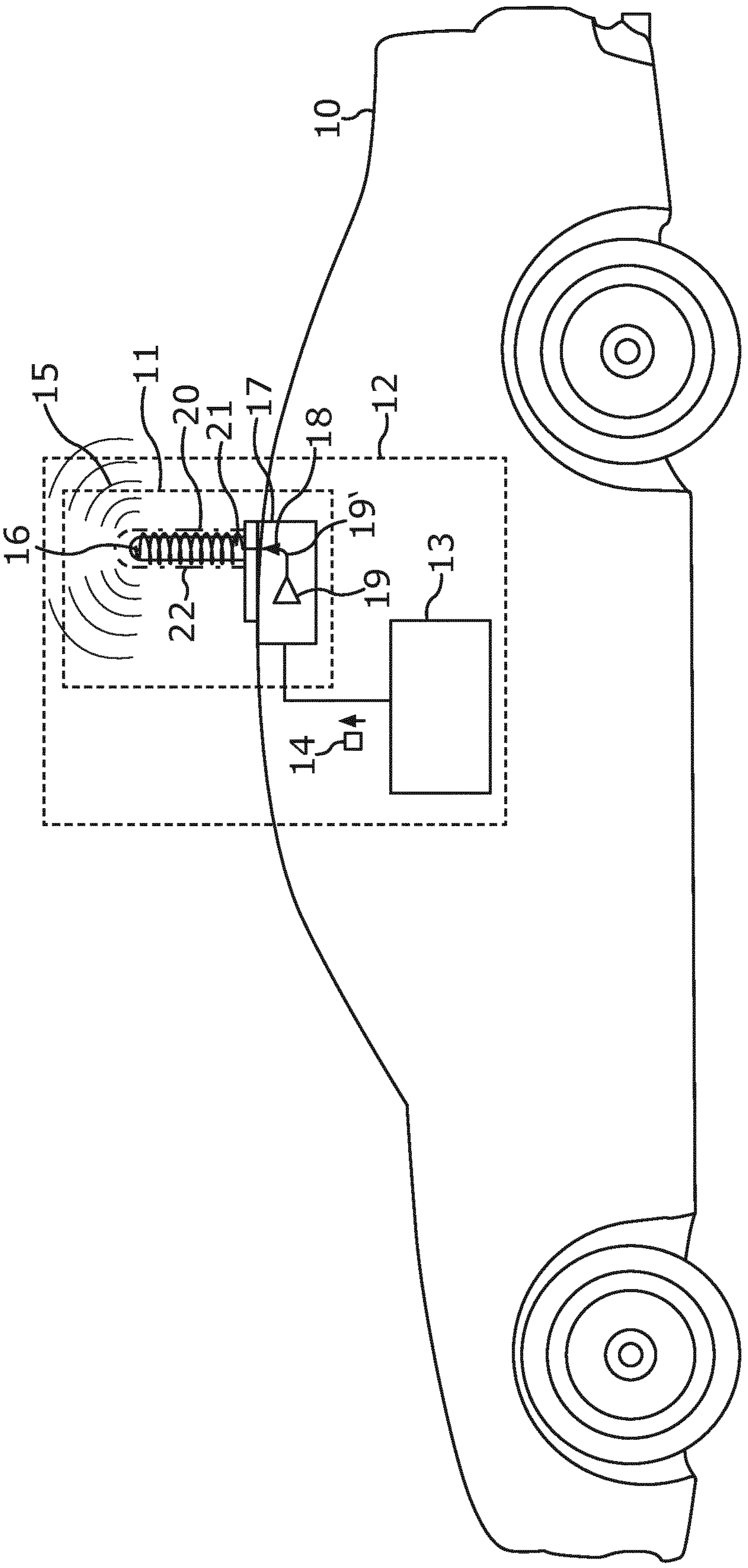
FIG. 1 shows a schematic illustration of an embodiment of the motor vehicle according to an embodiment of the invention.

FIG. 1 shows a motor vehicle 10 that for example can be a car or a truck. A transmission device 11 that can be a part of a radio key system 12, for example, can be provided in the motor vehicle 10. In this case, the transmission device 11 can be actuated by a control circuit 13 of the radio key system 12 using a transmission signal 14.

In general, a radio signal 15 can be generated by way of the transmission device 11 on the basis of the transmission signal 14 and emitted by the motor vehicle 10. To this end, the transmission device can have a coil antenna 16 and a driver circuit 17 for driving or actuating the coil antenna 16. The driver circuit 17 can take the transmission signal 14 as a basis for generating an AC current 18, for example by way of an amplifier element 19, for example an operational amplifier or a transistor circuit. The amplifier element 19 of the driver circuit 17 can be coupled to the coil antenna 16 by way of a circuit part 19' that does not have a relevant filter property for the AC current 18, i.e. is free of resonance, for example. This can be a coaxial cable, for example.

The AC current 18 can flow in an electrical conducting element 20 of the coil antenna 16 and thereby generate an electromagnetic alternating field or a magnetic alternating field in the vicinity of the coil antenna 16, which propagates as the radio signal 15. The coil antenna 16 can be realized by a helix shape or coil shape of the conducting element 20.

In this case, the conducting element 20 can be mechanically supported by, for example, a support element 21 in the interior of the coil shape, around which the conducting element 20 can be wound, and/or by a support element 22 that can be placed around the coil antenna 16.

Figure 2:
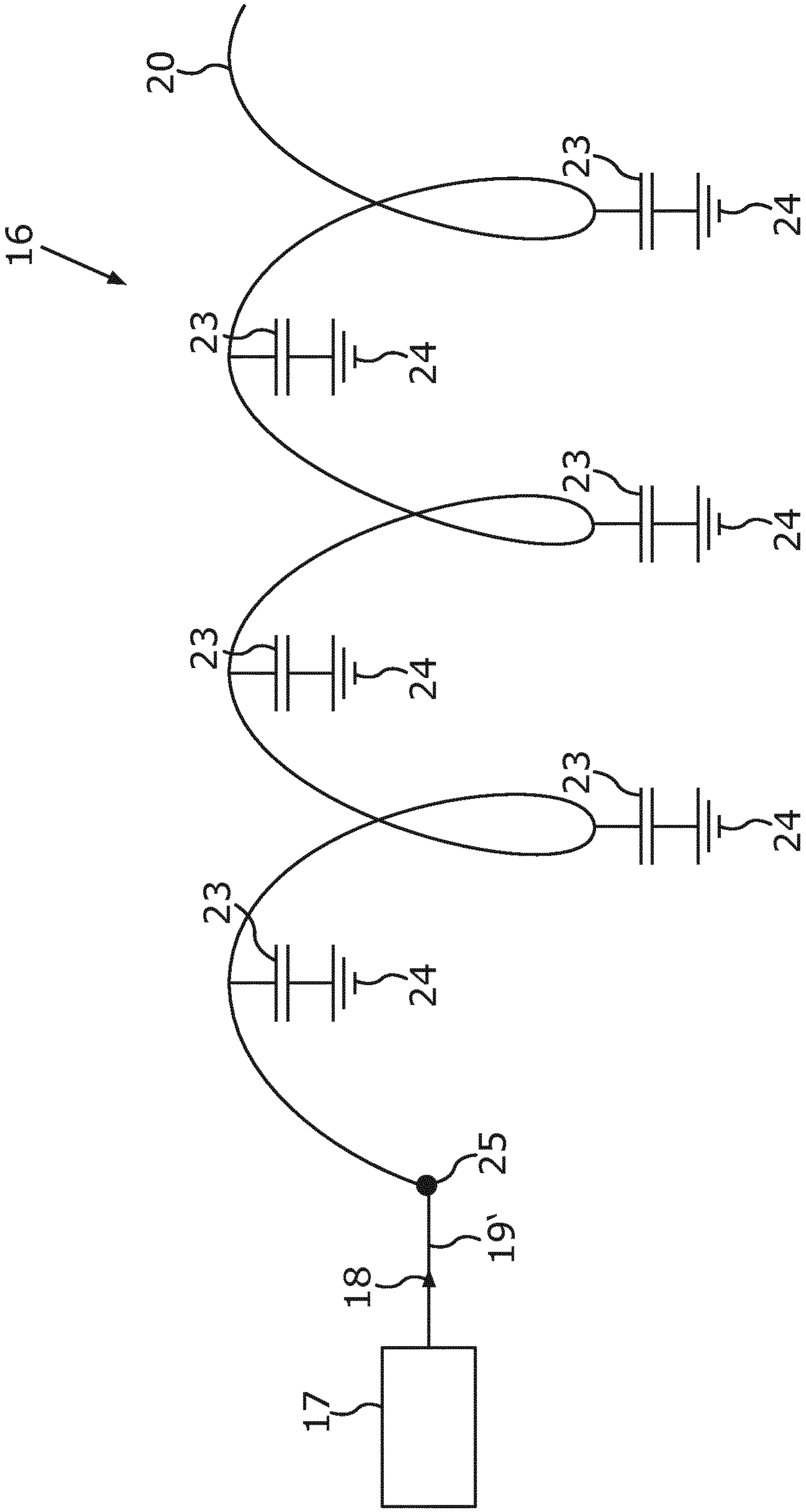
FIG. 2 shows a schematic equivalent circuit diagram for a coil antenna with parasitic parallel capacitance.

By virtue of the shape of the coil antenna 16 and/or the geometry and/or the support material of the respective support element 21, 22, a parasitic parallel capacitance 23 can be obtained along a course of the conducting element 20, as is represented symbolically in an equivalent circuit diagram in FIG. 2. The pitch of the coil shape is shown with an exaggerated size in FIG. 2 for the sake of better illustration, the turns of the conducting element 20 can also be touching (with an electrical insulation therebetween) or the conducting element 20 can also be in the form of a flat coil. It is shown that a differential component or a small component or a part of the parallel capacitance 23 can act on each section of the conducting element 20. By way of example, the parallel capacitance 23 can act with reference to a ground potential 24 and/or as a coupling capacitance from conductor section to conductor section.

Figure 3:
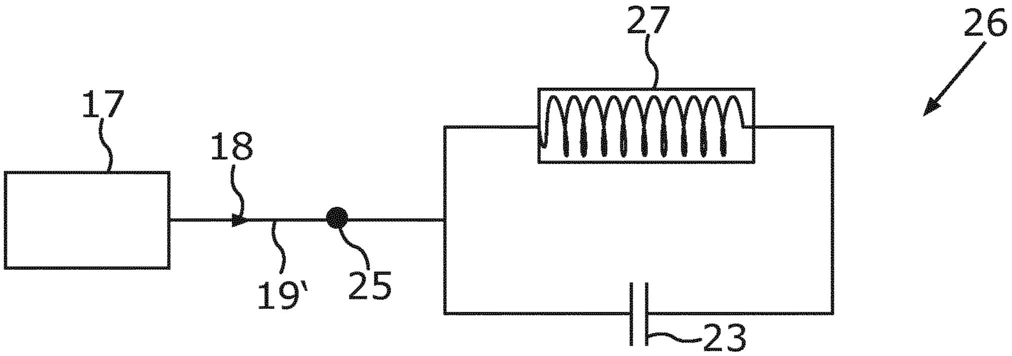
FIG. 3 shows a schematic equivalent circuit diagram of the coil antenna as a parallel resonant circuit.

Overall, from the perspective of a connection point 25 from which the driver circuit 17 sees the electrical effect of the coil antenna 16, an equivalent circuit diagram is obtained, as shown in FIG. 3. FIG. 3 shows the way in which a parallel resonant circuit 26—comprising the ensemble of the parallel capacitance 23 and a self-inductance 27 of the coil antenna 16 itself—is obtained overall for the connection point 25.

Figure 4:
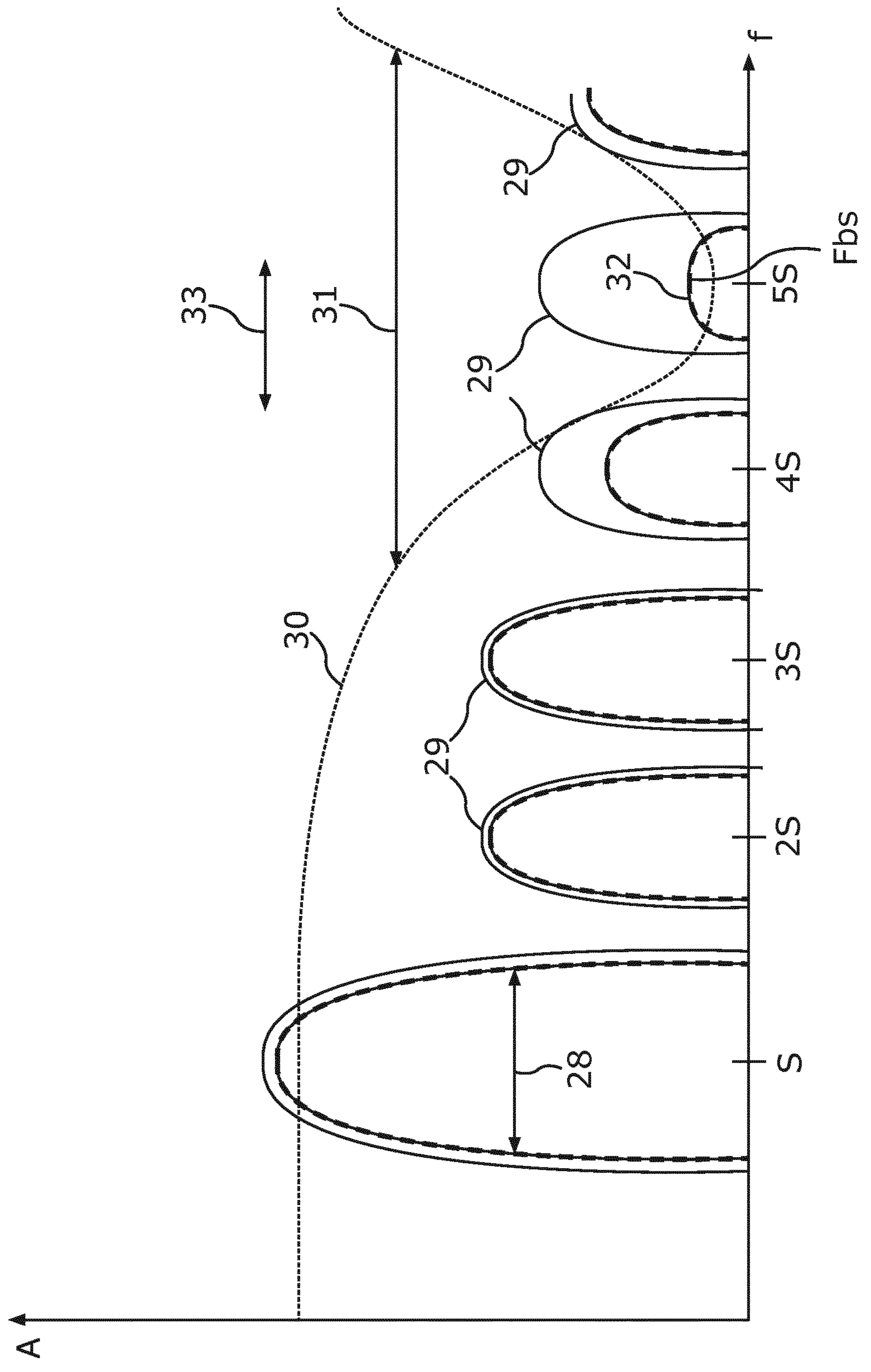
FIG. 4 shows a graph with schematic profiles of amplitude responses against the frequency.

FIG. 4 illustrates the way in which amplitudes A of electrical signals and/or magnetic radio signals can behave over frequency f as a result. In this case it is assumed that the driver circuit 17 generates the AC current 18 at a transmission frequency S to provide a transmission frequency band 28. Harmonics or harmonic waves 29 can additionally be produced, however, the amplitude A of which is also shown here without the effect of the parallel resonant circuit 26. From the perspective of the driver circuit 17, it is possible for the parallel resonant circuit 26 to act beyond the connection point 25, the frequency response 30 of said parallel resonant circuit, with a band-stop range 31, being able to have a damping effect on the harmonic waves 29, in particular in a range of a natural frequency Fbs in the band-stop range 31. The harmonics or harmonic waves 29 in the band-stop range 31 are damped as a result, which means that, in the radio signal 15 (FIG. 1), an amplitude characteristic 32 is obtained in which there is no loss of transmission power, or only an insignificant loss of transmission power, at the transmission frequency S, whereas, in the band-stop range 31, the harmonics or harmonic waves 29 are damped compared to the case in which the band-stop range 31 is not present. The band-stop range 31 can be defined as that frequency range in which damping caused by the parallel resonant circuit 26 is greater than 3 dB, in particular greater than 6 dB, preferably greater than 10 dB. At least one harmonic or harmonic wave 29 is selectively damped in the transmission device 11 as a result. In particular, this can be a harmonic or harmonic wave 29 that can be in a reception frequency range 33 of a radio receiver of the motor vehicle 10.

This results in the deliberate use of the natural resonance of an antenna in a series resonant circuit as an emission filter (damping of harmonic waves).

LIST OF REFERENCE SIGNS

10 Motor vehicle
11 Transmission device
12 Radio key system
13 Control circuit
14 Transmission signal
15 Radio signal
16 Coil antenna
17 Driver circuit
18 AC current
19 Amplifier element
19' Circuit part
20 Conducting element
21 Support element
22 Support element
23 Parallel capacitance
24 Ground potential
25 Connection point
26 Parallel resonant circuit
27 Self-inductance
28 Transmission frequency band
29 Harmonic waves
30 Frequency response
31 Band-stop range
32 Amplitude characteristic
33 Reception frequency range

The invention claimed is:

1. A transmission device for transmitting a radio signal from a motor vehicle, the transmission device comprising:

a coil antenna to emit the radio signal; and an electrical driver circuit configured to generate an electric AC current with a predetermined transmission frequency in order to produce the radio signal in the coil antenna, wherein:

the coil antenna is arranged on at least one support element and, on account of a geometry and/or a support material of the at least one support element and/or on account of a geometry of a coil shape of the coil antenna, a parasitic parallel capacitance is obtained which acts in parallel with a self-inductance of the coil antenna and, together with the self-inductance, acts as a parallel resonant circuit with a predetermined natural resonant frequency with respect to the driver circuit, and a value of the natural resonant frequency is set to an integer multiple of the transmission frequency by virtue of the geometry of the respective support element, a material type of the support material, and/or the geometry of the coil shape, or a band-stop range of the parallel resonant circuit covers the integer multiple.

2. The transmission device according to claim 1, wherein the integer multiple corresponds to the fourth, fifth, sixth, or seventh harmonic of the transmission frequency, or the transmission frequency is covered by the band-stop range.

3. The transmission device according to claim 1, wherein an amplifier element of the driver circuit is interconnected with the coil antenna by way of a circuit part that is free of resonant frequency, or at least one resonant frequency of the circuit part is different from the natural resonant frequency of the parallel resonant circuit.

4. The transmission device according to claim 1, wherein the transmission frequency is set to a value in a value range from 70 kHz to 250 kHz in the driver circuit.

5. The transmission device according to claim 1, wherein the driver circuit is configured to transmit a challenge signal for a radio key.

6. A radio key system for a motor vehicle, the radio key system comprising:

a control circuit for generating a transmission signal, wherein:

the control circuit is coupled to the transmission device according to claim 1, the control circuit is configured to actuate the transmission device by way of the transmission signal, and the control circuit is additionally coupled to a receiver circuit for a response signal of a radio key.

7. A motor vehicle comprising the radio key system according to claim 6.

8. The motor vehicle according to claim 7, the motor vehicle further comprising a radio receiver with a predetermined reception frequency range, wherein the natural resonant frequency of the parallel resonant circuit of the transmission device of the radio key system has a value that is in the reception frequency range.

* * * * *